United States Patent [19]

Hallberg

[11] 4,354,937
[45] Oct. 19, 1982

[54] PROCESS FOR PRECIPITATING HEAVY METALS FROM WASTEWATER

[75] Inventor: Rolf O. Hallberg, Tyreso, Sweden

[73] Assignee: Vyrmetoder AB, Täby, Sweden

[21] Appl. No.: 220,058

[22] PCT Filed: Apr. 22, 1980

[86] PCT No.: PCT/SE80/00121

§ 371 Date: Dec. 24, 1980

§ 102(e) Date: Dec. 12, 1980

[87] PCT Pub. No.: WO80/02281

PCT Pub. Date: Oct. 30, 1980

[30] Foreign Application Priority Data

Apr. 24, 1979 [SE] Sweden .............................. 7903598

[51] Int. Cl.$^3$ ............................................. C02F 1/62
[52] U.S. Cl. ................................... 210/607; 210/611; 210/717; 210/912
[58] Field of Search ............... 210/610, 611, 716, 717, 210/912, 913, 607, 724

[56] References Cited

U.S. PATENT DOCUMENTS 3,941,691  3/1976  Romanenko et al. .......... 210/913 X
4,200,523  4/1980  Balmat ............................... 210/611

FOREIGN PATENT DOCUMENTS 2253661  5/1973  Fed. Rep. of Germany.
2651673  3/1978  Fed. Rep. of Germany.
2446638  5/1978  Fed. Rep. of Germany.

OTHER PUBLICATIONS

*Chemical Abstract* 88 (1978):110.078 f, Yagisawa Mitsuo, Murakuri Yukie, Kato Yoshihiro, Tomizuka Noboru, Yamaguchi Muneo, Ooyama Jiro, Recovery of Useful Metals from Bacterial Leaching Solution and Abatement of Waste Water Acidity by Sulfate-Reducing Bacteria.
*Journal of Bacteriology*, vol. 97 (1979):2, pp. 594–602.
Chemical Abstracts 85(1976):106.534x, Jones, H. E., Trudinger, P. A., Chambers, L. A., Pyliotis, N. A., Metal Accumulation by Bacteria with Particular Reference to Dissimilitory Sulfate-Reducing Bacteria.
*Chemical Abstracts* 80 (1974):112.225v, Loginova, L. V., Ilyaletdinov, A. N., Euker, L. B., *Feasibility of Biochemical Purification of Balkhash Mining and Metallurgical Plant Effluents Using Sulfate-Reducing Bacteria.*

*Primary Examiner*—Thomas G. Wyse
*Attorney, Agent, or Firm*—Lyon & Lyon

[57] ABSTRACT

A process for precipitating heavy metals from wastewater containing sulfate ions by treatment of the water with sulfate reducing bacteria. Said bacteria will reduce the sulfate ions to hydrogen sulfide which in its turn will precipitate the metal ions in the form of metal sulfides. According to the invention the bacteria are cultured in one or more culturing vessels in the presence of a nutritive solution and a portion of the wastewater, and the resulting aqueous solution containing hydrogen sulfide produced by the bacteria is introduced into a precipitation vessel together with the remaining major portion of the wastewater.

7 Claims, No Drawings

PROCESS FOR PRECIPITATING HEAVY METALS FROM WASTEWATER

The present invention relates to a novel and very favourable process for precipitating heavy metals from wastewater.

Several industrial wastewaters contain heavy metals and sulfate—substances that are objectionable from an environmental point of view. There are mainly two types of industries discharging such wastewaters, viz. industries using acid pickling in connection with metal processing and plants for concentrating sulfide ores. A process for recovering sulfur and heavy metals from such wastewater effluents would not only protect the environment but would also be economically profitable.

Too high contents of metal and sulfate ions in wastewater will interfere with the natural biological purification process. Still more serious consequences are biological enrichment of toxic heavy metals in man's "food chain" and microbiological conversion of sulfate to toxic hydrogen sulfide, in certain cases resulting in a widespread poising of fish. Also comparatively low concentrations of metals in the wastewater may in the long run affect plant and animal life in lakes and streams since the organisms will progressively enrich the metals in the food chain.

The methods up to now mainly used or tested for the removal of heavy metals from wastewater are the following:

(1) Precipitation of sparingly soluble metals by means of chemical additives.
(2) Electrolytic precipitation.
(3) Exchange of the metal ion in question for an equivalent amount of another positive ion, by means of ion exchange techniques.
(4) Chemical extraction.

The simplest of said four methods and therefore the method most commonly used at present is the first mentioned method. It involves precipitation of sparingly soluble heavy metal salts by means of e.g. a hydroxide. This precipitation has to be carried out at a certain optimal pH value. After the precipitation step the pH of the wastewater is adjusted to a value suitable for the receiving body of water. This pH adjustment may often be accomplished at the same time as the separation of heavy metal containing sludge.

Electrolytic precipitation of metals is at present hardly conceivable as a possible means for purifying wastewaters but may well be suitable for certain concentrated baths. Ion exchange techniques at present cannot either compete with chemical precipitation. This of course is mainly due to the excessively high investment costs for ion exchange plants designed for large amounts of water. Chemical extraction is possible but is cumbersome when large volumes of water are to be treated.

It is also known that a microbiological process can be utilized for the precipitation of heavy metals. In said process the water is treated with sulfate reducing bacteria which reduce the sulfate ions to hydrogen sulfide which in its turn precipitates the metal ions in the form of metal sulfides. This method, however, has not been adapted for use in actual practice, due to the fact that the whole process has been carried out in a single vessel. When performed in this manner the process gives a very finely crystalline sulfide precipitate the removal of which by sedimentation or filtration is extremely difficult.

The object of the present invention is to provide an improved microbiological precipitation process which is carried out in two steps and which can be used on an industrial scale. Said object has been attained by means of a novel process for precipitating heavy metals from wastewater containing sulfate ions, wherein the water is treated with sulfate reducing bacteria which reduce the sulfate ions to hydrogen sulfide which in its turn precipitates the metal ions in the form of metal sulfides. According to the invention said process is characterized in that the bacteria are cultured in one or more culturing vessels in the presence of a nutritive solution and a portion of the wastewater, and that the resulting aqueous solution containing hydrogen sulfide produced by the bacteria is introduced into a precipitation vessel together with the remaining major portion of the wastewater.

The precipitation carried out in said precipitation vessel produces the metal sulfides in the form of a flocky precipitate (flocs) which settles easily, especially when the wastewater contains iron(III)ions. By the use of a separate culturing vessel it is furthermore possible to perform the culturing with continuous stirring, and the amount of organic material added can be reduced whereby the process will be rendered more economical.

The precipitation of the metal sulfides takes place instantaneously due to the low solubility product thereof. Metals which can be precipitated in accordance with the inventive process are e.g. the biocides Pb, Hg and Cd and several other metals such as Fe, Cu, Ni, Zn, Co, Mn and Ag. Tests have shown this process to be of high potential value if applied to the purification of these types of wastewater. The process works according to a reliable biological-chemical principle. The metal sulfides precipitated may e.g. be recycled and subjected to a new concentration process.

Sulfate reducing bacteria useful in the process are e.g. Desulfovibrio and Desulfotomaculum.

A suitable nutrient substrate has to be added to promote the growth of the bacteria. A nutritious industrial wastewater, such as wastewater from yeast factories, breweries or dairies, may suitably be used as the nutritive solution. By this means the amount of organic discharge from the process can be kept on a very low level.

The pH range useful for the culturing of the bacteria is 5.5-9. The optimum pH value is between 6 and 8, preferably about 7. The bacterial degradation of the nutrient substrate results in the formation of organic acids, chiefly acetic acid, so the pH value will drop during the course of the culturing. It is therefore normally necessary to control the pH value by the addition of alkali, e.g. NaOH.

The process according to the invention may be carried out batchwise or continuously. A continuous process according to the invention will be described in detail below.

The process is carried out in two separate vessels (containers, tanks, basins), viz. a culturing vessel and a precipitation vessel. Most of the culturing of the bacteria takes place in the culturing vessel. Almost all the organic material is consumed in said vessel. A portion of the wastewater to be purified from heavy metals, a nutritive solution and an alkali solution (e.g. a NaOH solution) for pH control are introduced continuously into said vessel. When the pH is adjusted to e.g. pH 6 the resulting precipitate is predominantly iron in the form of hydroxide and/or oxyhydroxide. Other metals will be coprecipitated to a varying extent. The pH adjustment of the wastewater and the concomitant hydroxide precipitation may, if desired, by accomplished in a separate step before the wastewater is introduced into the culturing vessel. The contents of the culturing vessel are agitated slowly and the precipitate thus formed may to a certain extent be discharged through a bottom valve. The holding time in the culturing vessel may be between 10 and 40 hours.

In the culturing vessel the sulfate ions present in the wastewater are reduced to $H_2S$ by the activity of the bacteria. The resulting aqueous solution containing $H_2S$ is fed continuously to the precipitation vessel into which also the remaining portion of the wastewater is introduced continuously. Precipitation of metal sulfides proceeds quickly in the precipitation vessel, and these metal sulfides are obtained as a flocky precipitate which settles readily to form a deposit. The deposit may be removed through a bottom valve in the precipitation vessel. The precipitate may also be settled in a subsequent third vessel. Furthermore, finer particles may be separated in a subsequent filter of any suitable type. The holding time in the precipitation vessel may be between 0.5 and 2 hours. By suitable choice and adjustment of the relative proportions of (a) the amounts (flows) of wastewater fed directly to the precipitation vessel and (b) the amounts fed to the culturing vessel, it will be possible to accomplish complete precipitation of the heavy metals in the wastewater and at the same time prevent the purified water from still carrying an unacceptably high residual content of hydrogen sulfide.

The purified water discharged may contain bacteria which are capable of further continuing to reduce sulfate, but these bacteria will be active only on the twofold condition that they are supplied with nutritive substances and that the pH value is higher than 5.5. Neither one of these two conditions is fulfilled in the water discharged. Moreover, bacteria of this kind are present in all natural receiving bodies of water and therefore the bacteria added via the discharge water do not provide any contribution capable of changing the preexisting ecological system.

In practical tests performed in accordance with the process described above the following results have been attained: A simulated wastewater was purified which had the following sulfate and metal contents: $SO_4 \approx 600$ mg/l; Cu 10 mg/l; $Zn \approx 600$ mg/l; $Fe \approx 500$ mg/l. The unfiltrated water coming from the precipitation vessel contained: $Cu < 0.1$ mg/l; $Zn < 0.1$ mg/l; Fe 10-50 mg/l; $H_2S \approx 10$ mg/l. Deliberately the output Fe content has not been decreased to zero which would actually be possible by means of a pH adjustment in the precipitation vessel. Instead, the residual iron may be used with advantage in combination with other processes. A subsequent aeration of the output water will oxidize the residual $H_2S$ to sulfate and $Fe^{2+}$ to $Fe^{3+}$. The trivalent iron may then either be recycled to a microbial process for leaching sulfide ore, or be used as a flocculant in the receiving body of water; in the latter case not only metals but also phosphorus will be coprecipitated.

The biological process according to the invention has major advantages as compared to a mere chemical precipitation of metal ions. The process is cleaner. No addition of chemicals is necessary which minimizes the risk of chain reactions with other substances.

The solubility products of sulfides are essentially lower than those of hydroxides, so the residual content of heavy metals after the treatment is substantially lower in the biological process. This means that the biological process will work well also with wastewaters having very low input contents of heavy metals, in contrast to the chemical precipitation process which cannot be used for low input contents. (Examples of solubility products: CuS $10^{-36}$, $Cu(OH)_2$ $10^{-19}$; CdS $10^{-26}$, $Cd(OH)_2$ $10^{-14}$; ZnS $10^{-25}$, $Zn(OH)_2$ $10^{-17}$.)

Summing up, the process according to the invention is of great commercial value for the following reasons: it lends itself excellently to continuous operation; it is cheap since no expensive chemicals have to be added; it does not require any high capital investment costs since the tank volumes may be kept within acceptable limits; it may be applied in industries which large wastewater volumes; it will tolerate high metal concentrations.

I claim:

1. A process for precipitating heavy metals from wastewater containing sulfate ions, wherein the water is treated with sulfate reducing bacteria which reduce the sulfate ions to hydrogen sulfide which in its turn precipitates the metal ions in the form of metal sulfides, wherein the bacteria are cultured in one or more culturing vessels in the presence of a nutritive solution and a portion of the wastewater, and that the resulting aqueous solution containing hydrogen sulfide produced by the bacteria is introduced into a precipitation vessel together with the remaining major portion of the wastewater.

2. A process as claimed in claim 1 wherein the bacteria are selected as Desulfovibrio or Desulfotomaculum.

3. A process as claimed in either claim 1 or 2 including maintaining the pH for culturing the bacteria in the range of 5.5 to 9.

4. A process as claimd in claim 3 wherein the pH is substantially 7.

5. A process as claimed in claim 3 including affecting agitation during culturing.

6. A process for precipitating heavy metals from wastewater containing sulfate ions, wherein the water is treated with sulfate reducing bacteria which reduce the sulfate ions to hydrogen sulfide which in its turn precipitates, as a floc, the ions in the form of metal sulfides, wherein the bacteria are cultured in one or more culturing vessels in the presense of a nutritive solution and a portion of the wastewater, and that the resulting aqueous solution containing hydrogen sulfide produced by the bacteria is introduced into a precipitation vessel together with the remaining major portion of the wastewater.

7. A process as claimed in claim 6 including effecting agitation during culturing.

* * * * *